US012631490B2

(12) United States Patent
Chen et al.

(10) Patent No.: US 12,631,490 B2
(45) Date of Patent: May 19, 2026

(54) SYSTEM AND DEVICE FOR DETERMINING A COLOR VALUE OF A TARGET OBJECT, AND METHODS THEREOF

(71) Applicant: Colgate-Palmolive Company, New York, NY (US)

(72) Inventors: Xiang Chen, Somerset, NJ (US); Donghui Wu, Bridgewater, NJ (US)

(73) Assignee: Colgate-Palmolive Company, New York, NY (US)

( * ) Notice: Subject to any disclaimer, the term of this patent is extended or adjusted under 35 U.S.C. 154(b) by 397 days.

(21) Appl. No.: 18/257,937

(22) PCT Filed: Dec. 15, 2021

(86) PCT No.: PCT/US2021/063486
§ 371 (c)(1),
(2) Date: Jun. 16, 2023

(87) PCT Pub. No.: WO2022/132882
PCT Pub. Date: Jun. 23, 2022

(65) Prior Publication Data
US 2024/0053203 A1     Feb. 15, 2024

Related U.S. Application Data

(60) Provisional application No. 63/126,815, filed on Dec. 17, 2020.

(51) Int. Cl.
*G01J 3/46* (2006.01)
*G01J 3/02* (2006.01)
*G01J 3/50* (2006.01)

(52) U.S. Cl.
CPC ............. *G01J 3/508* (2013.01); *G01J 3/0297* (2013.01); *G01J 3/463* (2013.01)

(58) Field of Classification Search
CPC .. G01J 3/508; G01J 3/522; G01J 3/463; G01J 3/524; G01J 3/52
(Continued)

(56) References Cited

U.S. PATENT DOCUMENTS 5,383,020 A     1/1995 Meillefosse
5,766,006 A     6/1998 Murljacic
(Continued)

FOREIGN PATENT DOCUMENTS

CN         104346803         2/2015
EP          2893477          7/2015
(Continued)

OTHER PUBLICATIONS

Chanjira et al., 2016, "Color correction on digital image based on reference color charts surrounding object", International Symposium on Intelligent Signal Processing and Communication Systems (ISPACS), IEEE:1-6.
(Continued)

*Primary Examiner* — Jamares Q Washington

(57)             ABSTRACT

A method of determining a color value of a target object is provided. The method includes capturing an image having a color calibration object and a color reference object. Computed calibration color values for the color calibration object and a first computed reference color value for the color reference object may be determined based on the single first image. A color calibration coefficient may be determined. A corrected reference color value may be determined based on the color calibration coefficient and the first computed reference color value. A second image may be captured. A second computed reference color value of the color reference object and a computed object color value of the target object may be determined based on the second image. A corrected object color value may be determined based on the
(Continued)

corrected reference color value, the second computed reference color value, and the computed object color value.

20 Claims, 11 Drawing Sheets

(58) Field of Classification Search
USPC ........................................ 382/162, 167, 209
See application file for complete search history.

(56) References Cited

U.S. PATENT DOCUMENTS

| | | | |
|---|---|---|---|
| 6,190,170 B1 | 2/2001 | Morris et al. | |
| 7,064,830 B2 | 6/2006 | Giorgianni et al. | |
| 7,756,327 B2 | 7/2010 | Komiya et al. | |
| 7,826,728 B2 | 11/2010 | Konno et al. | |
| 8,073,212 B2 | 12/2011 | Gerlach et al. | |
| 8,571,281 B2 | 10/2013 | Wong et al. | |
| 9,478,043 B2 | 10/2016 | Abdulwaheed | |
| 9,593,982 B2 | 3/2017 | Rhoads et al. | |
| 9,787,965 B2 | 10/2017 | Tozuka et al. | |
| 10,271,732 B2 | 4/2019 | Chen et al. | |
| 10,547,780 B2 | 1/2020 | Abdulwaheed | |
| 11,094,085 B2 | 8/2021 | Lerch et al. | |
| 2005/0196039 A1 | 9/2005 | Bengel et al. | |
| 2008/0021584 A1* | 1/2008 | Whaite | G01S 17/89 |
| | | | 700/109 |
| 2013/0148885 A1* | 6/2013 | Lings | G01J 3/524 |
| | | | 382/165 |
| 2013/0201200 A1* | 8/2013 | Mendez Alcazar | G06T 11/001 |
| | | | 345/589 |
| 2020/0121228 A1 | 4/2020 | Taylor et al. | |

FOREIGN PATENT DOCUMENTS

| | | |
|---|---|---|
| KR | 20180035488 | 4/2018 |
| WO | 2012/038474 | 3/2012 |
| WO | 2014/172033 | 10/2014 |
| WO | 2015/082300 | 6/2015 |
| WO | 2017/046829 | 3/2017 |
| WO | 2017/117120 | 7/2017 |
| WO | 2018/080413 | 5/2018 |
| WO | 2018/115437 | 6/2018 |
| WO | 2019/185501 | 10/2019 |
| WO | 2019/207588 | 10/2019 |
| WO | 2020/141346 | 7/2020 |
| WO | 2022/132882 | 6/2022 |

OTHER PUBLICATIONS

International Search Report and the Written Opinion of the International Searching Authority issued in International Application PCT/US2021/063486 mailed Mar. 31, 2022.

* cited by examiner

| No. | Description | CIE D65 @2 Degree | | |
|---|---|---|---|---|
| | | L* | a* | b* |
| 1 | dark skin | 37.77 | 12.59 | 13.74 |
| 2 | light skin | 65.43 | 16.85 | 17.38 |
| 3 | blue sky | 50.22 | -2.3 | -21.55 |
| 4 | foliage | 43.04 | -14.94 | 22.05 |
| 5 | blue flower | 55.37 | 11.46 | -25.16 |
| 6 | bluish green | 70.91 | -33.13 | 0.66 |
| 7 | orange | 62.04 | 33.61 | 56.36 |
| 8 | purplish blue | 40.66 | 16.04 | -45.14 |
| 9 | moderate red | 50.62 | 47.7 | 15.2 |
| 10 | purple | 30.44 | 24.89 | -21.59 |
| 11 | yellow green | 72.29 | -27.95 | 57.87 |
| 12 | orange yellow | 71.39 | 15.89 | 67.71 |
| 13 | blue | 29.57 | 20.6 | -49.21 |
| 14 | green | 55.23 | -41.21 | 31.93 |
| 15 | red | 41.47 | 52.75 | 26.87 |
| 16 | yellow | 81.22 | -0.44 | 80.27 |
| 17 | magenta | 51.73 | 51.21 | -15.24 |
| 18 | cyan | 51.56 | -23.97 | -27.85 |
| 19 | white (.05*) | 96.53 | -0.53 | 1.18 |
| 20 | neutral 8 (.23*) | 81.25 | -0.67 | 0.32 |
| 21 | neutral 6.5 (.44*) | 66.78 | -0.68 | -0.49 |
| 22 | neutral 5 (.70*) | 50.87 | -0.13 | -0.27 |
| 23 | neutral 3.5 (.1.05*) | 35.67 | -0.3 | -1.21 |
| 24 | black (1.50*) | 20.47 | 0.01 | -0.96 |

FIG. 4A

| No. | Description | L* | a* | b* |
|-----|-------------|-----|-----|-----|
| 1 | dark skin | 35.14501 | 9.480351 | 12.3804 |
| 2 | light skin | 64.79427 | 20.54351 | 23.01197 |
| 3 | blue sky | 46.91165 | -3.85291 | -24.4783 |
| 4 | foliage | 39.5271 | -13.6273 | 19.35907 |
| 5 | blue flower | 53.6765 | 10.76474 | -29.8487 |
| 6 | bluish green | 70.3659 | -35.6828 | 1.019018 |
| 7 | orange | 60.54935 | 40.42663 | 59.96235 |
| 8 | purplish blue | 39.73278 | 17.65694 | -47.3575 |
| 9 | moderate red | 52.96797 | 48.26553 | 19.41595 |
| 10 | purple | 30.20602 | 16.68016 | -20.2464 |
| 11 | yellow green | 72.52374 | -18.1598 | 61.22621 |
| 12 | orange yellow | 72.25446 | 19.64031 | 67.14583 |
| 13 | blue | 27.93504 | 19.89868 | -46.3319 |
| 14 | green | 55.46156 | -36.1491 | 33.88861 |
| 15 | red | 42.94734 | 49.26195 | 26.85073 |
| 16 | yellow | 81.66167 | 5.900496 | 72.10224 |
| 17 | magenta | 51.76018 | 49.43406 | -15.8901 |
| 18 | cyan | 51.16268 | -22.0091 | -26.6052 |
| 19 | white (.05*) | 99.51478 | -3.97806 | 0.773108 |
| 20 | neutral 8 (.23*) | 84.01669 | -4.23493 | -1.62644 |
| 21 | neutral 6.5 (.44*) | 69.7892 | -4.94818 | 0.536147 |
| 22 | neutral 5 (.70*) | 47.60418 | -4.06844 | -0.09323 |
| 23 | neutral 3.5 (.1.05*) | 34.33111 | -4.60659 | -0.93938 |
| 24 | black (1.50*) | 21.55676 | -3.93753 | -1.93974 |

FIG. 4B

| No. | Description | L* | a* | b* |
|---|---|---|---|---|
| 1 | dark skin | 34.9801 | 6.567997 | 13.56868 |
| 2 | light skin | 64.50361 | 14.9857 | 24.94209 |
| 3 | blue sky | 42.79698 | 5.813718 | -29.2504 |
| 4 | foliage | 39.89685 | -17.5777 | 24.10319 |
| 5 | blue flower | 48.77023 | 21.7596 | -37.1359 |
| 6 | bluish green | 67.84462 | -31.7467 | 4.080935 |
| 7 | orange | 63.92202 | 22.27698 | 67.17275 |
| 8 | purplish blue | 33.67231 | 33.30517 | -58.5928 |
| 9 | moderate red | 52.74173 | 42.19961 | 18.06234 |
| 10 | purple | 27.09975 | 23.49882 | -26.0455 |
| 11 | yellow green | 75.64892 | -33.757 | 74.25637 |
| 12 | orange yellow | 75.89995 | 0.575585 | 77.6653 |
| 13 | blue | 22.41715 | 34.67035 | -57.486 |
| 14 | green | 56.64822 | -43.0792 | 43.49989 |
| 15 | red | 43.81061 | 40.43222 | 26.92778 |
| 16 | yellow | 85.44397 | -13.7692 | 84.83533 |
| 17 | magenta | 48.20376 | 54.34009 | -24.1983 |
| 18 | cyan | 46.7101 | -10.7408 | -30.067 |
| 19 | white (.05*) | 95.81674 | -0.1712 | 0.470622 |
| 20 | neutral 8 (.23*) | 80.67803 | -0.26929 | -2.23921 |
| 21 | neutral 6.5 (.44*) | 67.19838 | -2.18513 | 0.53193 |
| 22 | neutral 5 (.70*) | 45.7941 | -2.01048 | -0.11802 |
| 23 | neutral 3.5 (.1.05*) | 32.94483 | -2.77817 | -0.96449 |
| 24 | black (1.50*) | 20.55883 | -2.32198 | -2.11623 |

FIG. 4C

| | R | G | B |
|---|---|---|---|
| | Establish Tuning Coefficients | | |
| 504 No.19 (white) – True value | 243 | 243 | 243 |
| 506 No.19 (white) – Determined by Mobile Device | 212 | 214 | 166 |
| 508 Tuning Coefficients | (243/212) = 1.1437 | (243/214) = 1.1305 | (243/166) = 1.4557 |
| 510 Reference Card–Determined by Mobile Device | 202 | 202 | 159 |
| 512 Reference Card(Corrected) | (1.1437*202)=231 | (1.1305*202) = 229 | (1.4557*159) = 230 |
| | Correct Object's Color | | |
| 514 Reference Card–Determined by Mobile Device | 203 | 202 | 157 |
| 516 Object –Determined by Mobile Device | 88 | 69 | 42 |
| 518 Object - Corrected | ((231/203)*88)=100 | ((229/202)*69) =78 | ((230/157)*42) =62 |

FIG. 5

| Shade Tab No. | Mobile Device | | | Hyperspectral Camera | | |
|---|---|---|---|---|---|---|
| | L* | a* | b* | L* | a* | b* |
| 1 | 90.100 | -3.324 | 4.792 | 83.634 | -0.370 | 2.512 |
| 2 | 89.213 | -3.151 | 7.595 | 83.302 | -0.375 | 4.985 |
| 3 | 88.652 | -3.450 | 7.967 | 82.677 | -0.668 | 5.558 |
| 4 | 87.829 | -3.172 | 10.391 | 81.115 | -0.272 | 7.145 |
| 5 | 86.624 | -2.580 | 12.895 | 80.133 | 0.079 | 9.102 |
| 6 | 86.437 | -2.679 | 15.385 | 80.689 | 0.163 | 11.643 |
| 7 | 86.067 | -2.327 | 16.068 | 79.119 | -0.033 | 11.553 |
| 8 | 86.189 | -2.512 | 18.336 | 79.351 | -0.061 | 13.082 |
| 9 | 86.205 | -2.400 | 20.798 | 79.800 | -0.005 | 14.960 |
| 10 | 85.450 | -2.017 | 20.479 | 79.582 | 0.396 | 15.464 |
| 11 | 84.636 | -2.013 | 19.503 | 77.991 | 0.573 | 14.172 |
| 12 | 83.527 | -1.089 | 22.263 | 77.350 | 1.449 | 16.881 |
| 13 | 82.757 | -1.133 | 22.580 | 76.308 | 1.228 | 15.734 |
| 14 | 82.346 | -0.797 | 22.446 | 75.941 | 1.556 | 15.987 |
| 15 | 81.443 | -0.667 | 23.121 | 74.526 | 1.537 | 15.885 |
| 16 | 80.120 | 0.135 | 25.336 | 73.563 | 2.208 | 17.093 |
| 17 | 76.075 | 1.949 | 29.029 | 72.759 | 2.862 | 18.433 |
| 18 | 75.349 | 2.074 | 29.649 | 71.106 | 3.131 | 18.204 |
| 19 | 73.878 | 3.112 | 30.277 | 69.544 | 3.763 | 20.056 |
| 20 | 73.597 | 2.772 | 29.337 | 68.885 | 4.173 | 20.111 |
| 21 | 71.412 | 3.786 | 30.385 | 67.993 | 5.161 | 21.839 |
| 22 | 71.363 | 3.780 | 30.121 | 66.387 | 5.153 | 21.013 |
| 23 | 69.231 | 4.525 | 31.641 | 65.496 | 6.185 | 23.086 |
| 24 | 68.779 | 5.112 | 32.238 | 64.933 | 6.583 | 23.287 |
| 25 | 67.450 | 6.054 | 32.847 | 64.179 | 6.829 | 23.687 |
| 26 | 69.368 | 5.462 | 33.382 | 64.296 | 7.309 | 26.091 |
| 27 | 67.107 | 6.667 | 37.965 | 63.747 | 8.149 | 28.704 |
| 28 | 69.693 | 6.629 | 37.086 | 64.309 | 7.943 | 28.598 |
| 29 | 68.043 | 8.482 | 41.873 | 64.343 | 8.125 | 30.452 |

FIG. 7

SYSTEM AND DEVICE FOR DETERMINING A COLOR VALUE OF A TARGET OBJECT, AND METHODS THEREOF

CROSS-REFERENCE TO RELATED APPLICATION

This application claims the benefit of priority from U.S. Provisional Application No. 63/126,815, filed Dec. 17, 2020, the contents of which are hereby incorporated herein by reference in their entirety.

BACKGROUND

A tooth is comprised of an inner layer and an outer hard enamel layer that is the protective layer of the tooth. The enamel layer of a tooth is naturally an opaque white or slightly off-white color. It is this enamel layer that can primarily become stained or discolored. Many substances that an individual comes in contact with on a daily basis can stain or reduce the whiteness of his or her teeth. In particular, foods, and beverages such as red wine, tea and coffee tend to stain the teeth. These products or substances deposit and accumulate on the enamel layer of the tooth and form a pellicle film over the teeth. These staining and discoloration substances can then permeate the enamel layer.

It may be desirable to determine a color value of an object, such as a whiteness of teeth. For example, it may be desirable to determine the whiteness of the teeth to determine the efficacy of a teeth whiteness program. In particular, it may be desirable to determine the whiteness of teeth based on images produced by a consumer camera, such as a camera coupled to a mobile device. Due to a variety of factors, however, the true whiteness of teeth has not been effectively discoverable using conventional imaging techniques. What is therefore desired is a system, device, or method of effectively determining a whiteness of teeth using images taken by a mobile device camera.

BRIEF SUMMARY

The present disclosure may be directed, in one aspect, to a method of determining a whiteness value of at least one tooth. The method includes capturing, via a mobile device, a first image comprising both a color calibration object and a color reference object, wherein the color calibration object comprises a plurality of calibration colors each having a known calibration color value; determining, based on the single first image, computed calibration color values for each of the plurality of calibration colors of the color calibration object and a first computed reference color value for the color reference object; determining a color calibration coefficient based on a known color value of the known calibration color values and a corresponding computed calibration color value of the known calibration color values; determining a corrected reference color value based on the color calibration coefficient and the first computed reference color value; capturing, via the mobile device, a second image comprising both the color reference object and the at least one tooth; determining, based on the second image, a second computed reference color value of the color reference object and a computed object color value of the at least one tooth; and determining a corrected object color value based on the corrected reference color value, the second computed reference color value, and the computed object color value; and causing the corrected object color value to be displayed via a display.

In another aspect, the method includes determining the corrected object color value in a first color space; determining the corrected object color value in a second color space based on the corrected object color value in the first color space; and determining a whiteness value of the at least one tooth based on a transformation of the corrected object color value in the second color space. The method may include the first color space being an RGB color space and the second color space being a CIE L*a*b color space.

In another aspect, the method includes storing the whiteness value of the at least one tooth in the second color space and tracking whiteness values of the at least one tooth in the second color space over a period of time. The method may include determining a progress of a whiteness treatment of the at least one tooth based on the whiteness value of the at least one tooth in the second color space.

In another aspect, the color reference object may be a reference card comprising an open window, the color calibration object or the at least one tooth being viewable through the open window when the image is captured. The mobile device and the color reference object may be coupled with a jig to provide a predefined distance between the color calibration object or the at least one tooth viewable through the open window of the reference card and the mobile device.

In another aspect, the method is carried out for each of a red channel of the first and second images, a green channel of the first and second images, and a blue channel of the first and second images.

BRIEF DESCRIPTION OF THE DRAWINGS

The present disclosure will become more fully understood from the detailed description and the accompanying drawings, wherein:

FIGS. 4A-4C are tables of example CIE L*a*b color values, as described herein.

FIG. 5 is a table of example steps used to determine a corrected whiteness value of a tooth, as described herein.

FIG. 7 is a table showing example color values relating to a mobile device and a hyperspectral camera, as described herein.

DETAILED DESCRIPTION

Figure 1:
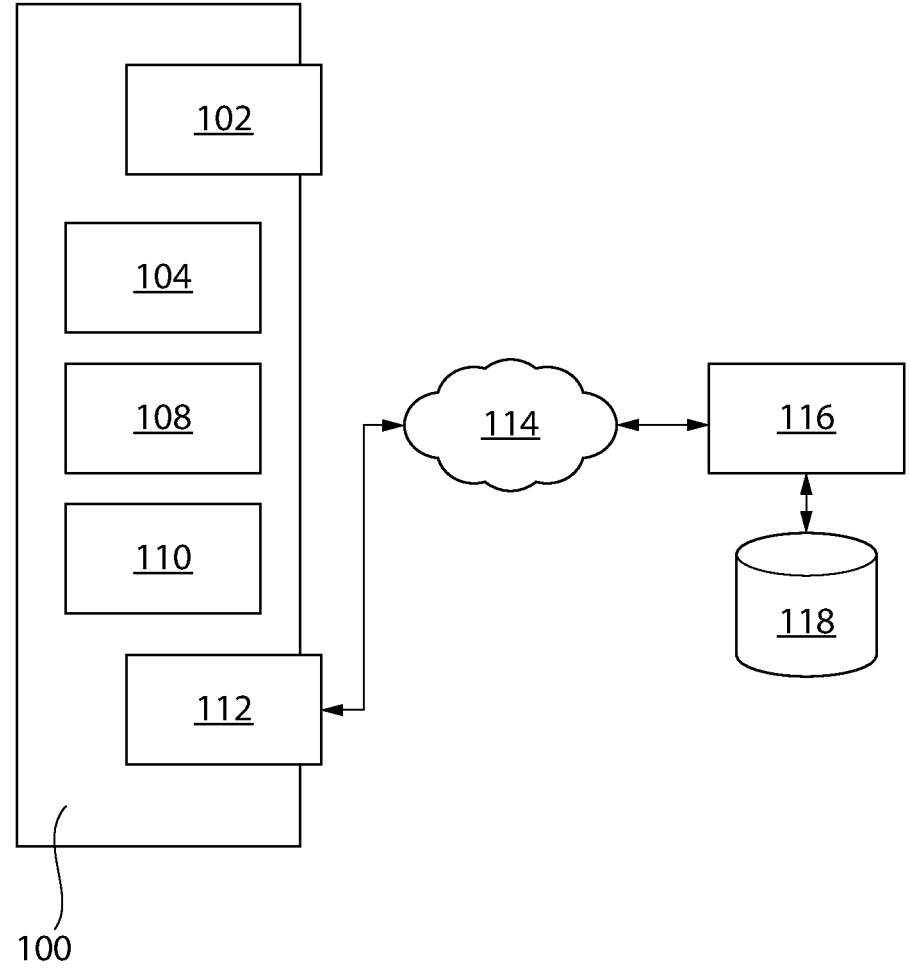
FIG. 1 is an example diagram of a system for determining a whiteness of at least one tooth, as described herein.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring now to the figures, FIG. 1 shows a mobile device 100 that may capture images in order to determine a color value of a target object. The color value may relate to one or more colors, such as a white value, a gray value, a beige value, a black value, etc. The color value may relate to one or more objects, such as one or more teeth, one or more test strips, one or more hair and/or skin tones, one or more color swatches, and the like. For example, mobile device 100 may capture images of one or more teeth to determine the whiteness value of the teeth. Although the description may focus on the whiteness value of teeth, it should be understood that such description is for illustration purposes only. Mobile device 100 may be used to take images to determine one or more color values of one or more objects, as described herein.

Mobile device 100 may take the image through a camera, such as camera 102. The user can use touchscreen 104 to actuate the camera 102 to capture and/or record the image. In an example, touchscreen 104 may present visual information to the user over the display portion of the touchscreen 104 and/or receive touch input from the user. The capturing of an image using the camera 102 and touchscreen 104 may be provided via processor 108 of mobile device 100. Processor 108 may be one or more types of processors known by those of skill in the art of digital image processing, such as an image processor. Processor 108 may operate under the guidance of programming instructions that may be stored on a memory 110 (e.g., non-volatile memory) of mobile device 100. The instructions may instruct the processor 108 on how to record an image, how to calculate a color value (e.g., whiteness value) for an object (such as teeth) found in the image, and the like.

Mobile device 100 may communicate with one or more devices via network 114 using network interface 112. For example, mobile device 100 may communicate with one or more remote servers 116 via a communication between network interface 112 and network 114. Remote server 116 may perform computations (such as computations of whiteness values of a tooth), image processing, storage (e.g., storage of image), and/or recollections of data from a database, such as database 118.

Database 118 may be locally connected to the server 116 and/or can be accessed by the server 116 over network 114. In an example, network 114 may be a wide area network such as the Internet. The data network interface 112 may connect mobile device 100 to a local wireless network that may provide one or more connections to the wide area data network. Network interface 112 may connect via IEEE 802.11 standards. In an example, the local network may be based on TCP/IP, and network interface 112 (e.g., the data network interface) may utilize a TCP/IP protocol stack. In other examples, the network 114 may be formed in part by a cellular data network. In such examples, network interface 112 may take the form of a cellular communication interface that communicates over the cellular network.

The programming that determines teeth whiteness may be performed on mobile device, may be stored remotely, and/or may be accessed over the network 114. For instance, a web browser may operate on the mobile device 100 using locally stored programming to determine all, or some, of teeth whiteness computations. The web browser may access a website or other remote programming over network 114. The remote programming may provide an interface for creating an image, determining a whiteness value for a user's teeth, and/or storing/comparing the whiteness values to other values stored on the remote server 116.

Mobile device 100 may take the form of a smart phone, tablet, computer, camera, and the like. Processor 108 of mobile device 100 may be a general purpose CPU, an image processor, and the like. Processor 108 of mobile device 100 may be a mobile specific processor. For example, mobile device 100 may use specific operating systems designed for mobile devices, such as iOS from Apple Inc. or ANDROID OS from Google Inc. The operating system programming may be stored on memory 110 and/or may be used by the processor 108 to provide a user interface for the touch screen display 120, handle communications for the device 100, and/or to manage and provide services to application programming (i.e., apps) that may be stored in the memory 110.

Although examples described herein may describe a camera integrated within a mobile device 100, in examples the camera may be an external camera, a standalone camera, a camcorder, or any device that may be used to capture one or more images of a tooth. In the example of an external camera, the external camera may be connected to the mobile device 100 (or another computing device) via one or more digital techniques, such as through an expansion bus, such as a USB connection.

Figure 2:
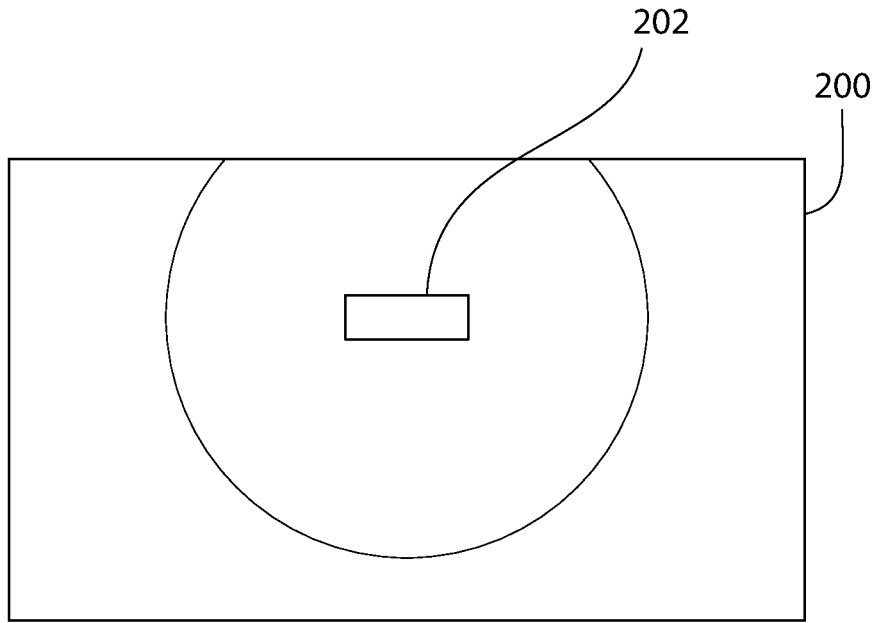
FIG. 2 is an example reference object for determining a whiteness of a tooth, as described herein.

FIG. 2 shows an example reference object (e.g., color reference object). Reference object may take one or more form factors, such as reference card 200. Reference object (e.g., reference card 200) may include one or more colors (such as gray, white, etc.), one or more shapes, one or more patterns, and the like. The colors, shapes, patterns, etc. of the reference object may be known. For example, the color value of the reference object (e.g., color value in the RGB color space or the CIELAB color space) may be known and may be a standard color value for the reference object.

The color presented on the reference object may be used as a reference color (e.g., baseline color). The reference color may be used to determine the whiteness of the teeth. The reference color of the reference object may be used to standardize the whiteness of the tooth. For example, one or more mobile devices may determine different whiteness values of a tooth. Such differences may be due to different illumination (e.g., brightness) values of the environment(s) in which the image is taken being variable, the lenses (e.g., quality of the lenses) of the mobile device(s) that take the image being variable, the processors (such as image processors) used to process the image being variable, etc. Such variability may result in different colors of an object (e.g., the reference object, a tooth, etc.) being shown in an image taken by two or more different cameras, or even the same camera taking a picture of the object at different times and/or at different locations.

An image of reference card 200 may be taken by the camera. As described herein, the reference card 200 may be associated with a known (e.g., baseline) color, such as a whiteness color value. The color value may be known in one or more color spaces, such as in the RGB color space, the CIELAB color space, and the like. The image of the reference card 200 may be captured independent of the object (e.g., one or more teeth) in one example, although in other examples the image (e.g., a single image) may include the reference card 200 and the object (e.g., teeth). In examples the reference card 200 may include window 202, and the object (e.g., one or more teeth) may be exposed within window 202 when the image is captured.

Reference card 200 may take many different form factors, patterns, colors, etc. Reference card 200 may include a solid color, two or more colors, one or more patterns, one or more shapes, one or more images, etc. In an example, reference card 200 may be associated with color No. 19 white, as provided in the table of published CIE L*a*b* of Xrite Colorchecker and shown on FIG. 4A. The published CIE L*a*b* of Xrite Colorchecker may ensure that a universal color is used for one or more reference cards 200, so that a foundational color may be used when determining the whiteness of teeth. Although the white No. 19 color may be described for reference card 200, such color is one example and the color of reference card 200 may be one or more other colors, such as neutral No. 22.

Figure 3:
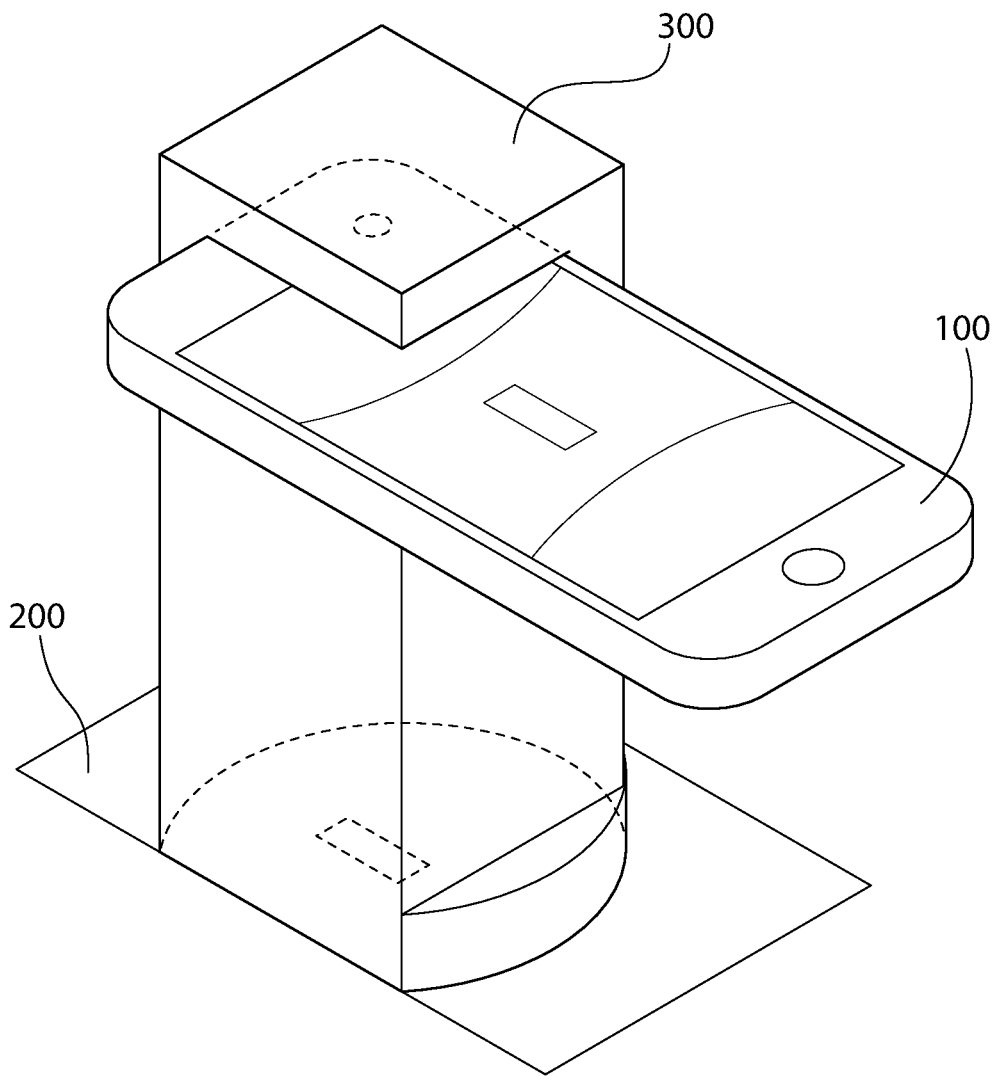
FIG. 3 is an example system for capturing an image of an object, as described herein.

FIG. 3 shows an example in which a mobile device may capture an image of a reference card 200 using a jig, such as jig 300. The jig may be similar to, or the same as, the jig described in related U.S. Pat. No. 10,271,732, which is incorporated herein by reference. Jig 300 may be configured to hold one or more devices, such as a mobile device 100, reference card 200, and the like. Jig 300 may be used to ensure that the reference card 200 and mobile device 100 (e.g., camera of mobile device 100) are distanced from each other according to a predetermined distance. The distance may be a standard distance that may be repeatable by one or more users and/or one or more uses. The distance between the mobile device 100 and the reference card 200 may be fixed, so that one or more (e.g., every) images of the reference card 200 is taken at the predetermined distance from camera (e.g., camera of the mobile device 100). The distance between the mobile device 100 and the reference card 200 may be fixed such that the illumination (e.g., brightness) of the flash of the camera (of the mobile device 100) is standard on every image of reference card 200. Although FIG. 3 shows the jig 300 in use to ensure a predetermined distance between the mobile device 100 and reference card 200, it should be understood that such example is for illustration purposes only. The jig 300 may be in use with the mobile device 100, reference card 200, and/or one or more objects, such as one or more teeth, to ensure that one or more objects are spaced apart according to a predetermined distance.

FIGS. 4A-4C show tables including example CIE L*a*b* ("CIELAB") XRite ColorChecker values of the CIELAB color space. The CIELAB color space is a color space defined by the International Commission on Illumination. The CIELAB color space expresses color as three values: L* for the lightness from black (0) to white (100); a* from green (−) to red (+); and b* from blue (−) to yellow (+). The CIELAB color space was designed so that the same amount of numerical change in the L*, a*, and b* values corresponds to roughly the same amount of visually perceived change.

The CIELAB values shown on FIG. 4A are published color values for each of the colors provided in the table. As a result, the CIELAB values for each of the colors provided in FIG. 4A are known and shareable from one or more devices and/or users. For example, No. 19 (white) on FIG. 4A has a known L* value of 96.53, a known a* value of −0.53, and a known b* value of 1.18. As these values are known for No. 19 white, this color can be reproducible and comparable from one or more devices, such as one or more mobile devices 100. Further, although 24 colors are shown on FIG. 4A, such example is for illustration purposes only. The number of CIELAB values may be any number that is supported by the CIELAB color space.

Figure 9:
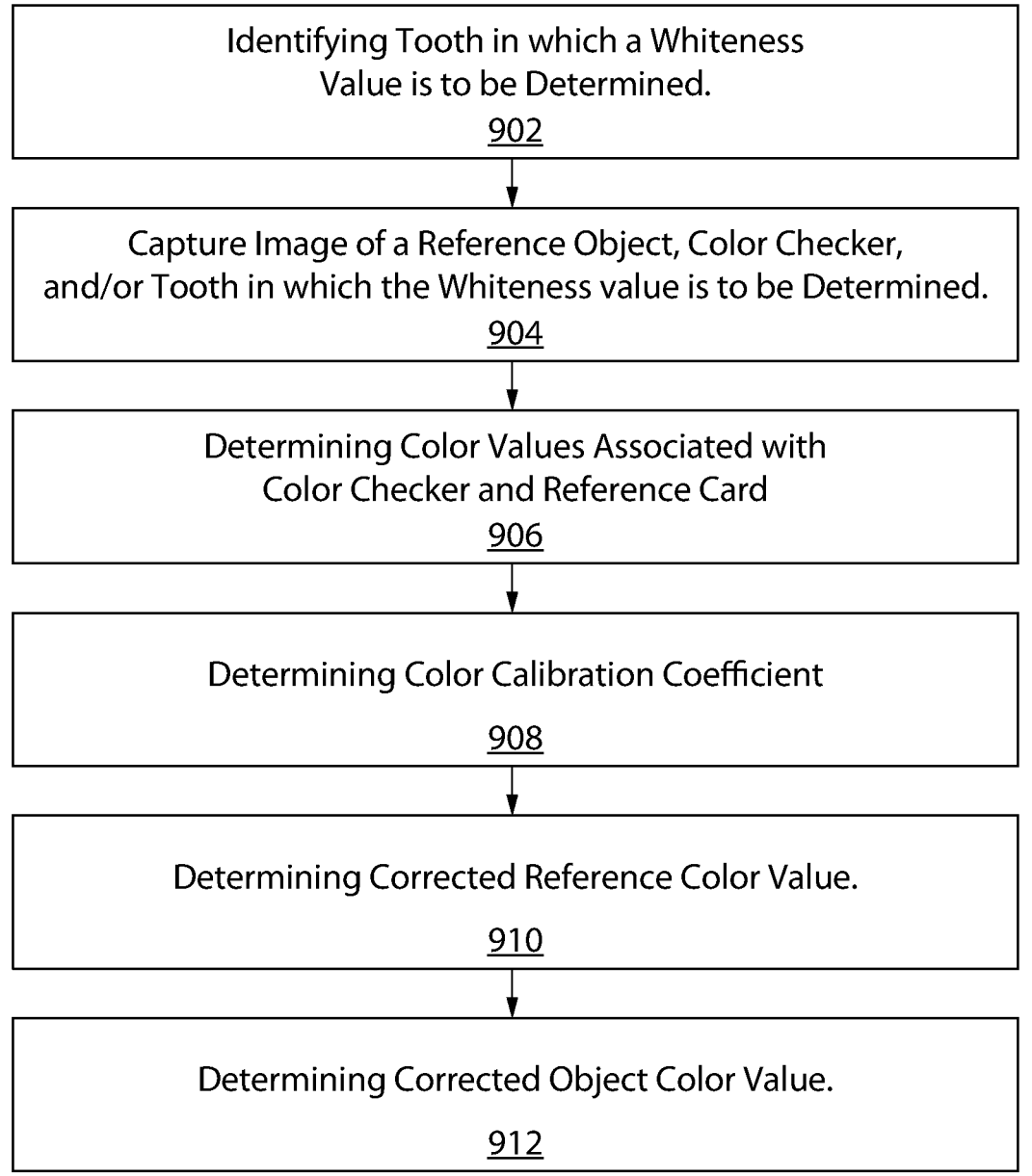
FIG. 9 is an example flowchart for determining a whiteness value of a tooth, as described herein.

FIG. 9 shows example steps for determining a color value of one or more objects, such as the whiteness value of one or more teeth. FIG. 5 shows example steps of determining a color value of one or more objects, along with example values. As shown on FIG. 5, the steps described herein may be carried out for each of a red channel of one or more images, a green channel of one or more images, and/or a blue channel of one or more images Although the below description relates to determining the whiteness value of one or more teeth, it should be understood such description this is for illustration purposes only and any color value for any object may be determined via the same, or similar, steps as provided herein.

At 902, the object may be identified in which the color value (e.g., whiteness value) is to be determined. For example, the one or more teeth may be identified in which the whiteness value may be determined, stored, tracked, and the like. The whiteness value may be determined, stored, and/or tracked in one or more color spaces, such as in an RGB color space and/or a CIELAB color space. For example, a user may be using a whitening system, program, device, etc., to whiten one or more of the user's teeth. The user may desire to determine the whiteness value of the tooth, for example, to track the progress of the whitening system, program, device, etc., to determine if (and to what degree) a tooth has been whitened as a result of the system, program, device, etc. The determination of the whiteness value may be performed for comparative determinations of previous whiteness values relating to the user, or from one or more teeth of other users, and the like.

At 904, an image of the tooth (e.g., the tooth identified in 902) may be captured. For example, the image of the tooth may be captured via mobile device 100, which may be a mobile phone, tablet, personal computer, camera, camcorder, as described herein. The image of the tooth may include one or more objects in addition to the one or more teeth of the user. For example, one or more color calibration devices and/or reference objects (e.g., reference cards) may be captured in the image.

The color calibration object may include one or more calibration colors each having a known calibration color value. In an example, the color calibration object may be a color card (e.g., color checker), such as a color checker card from Xrite, as described herein. In such example, the color checker may include one or more colors (e.g., 24 colors). Each of the colors associated with the color checker may correspond with color values that may be published, known, and/or shareable. For example, FIG. 4A shows a table in which 24 colors of an example color checker may be published, known, or shareable. As shown on FIG. 5, row 504 provides example known RGB values corresponding to No. 19 white, as associated with the color checker.

An image of the color calibration object (e.g., colors present on the color calibration object) may be captured by a mobile device, such as mobile device 100. At 906, one or more (e.g., each) of the color values of the colors on the color calibration object may be determined. For example, each of the color values of the colors on the color calibration object may be determined by the mobile device (e.g., one or more processors of the mobile device). The computed color values of the colors of the color calibration object may not be the same as the known (e.g., published) color values of the color calibration object. Such discrepancies between the computed color values and the published color values may be due to the lighting environment in which the image of the color calibration object is taken, the lens/flash of the camera taking the image of the color calibration object, the processor (e.g., processor speed) of the mobile device, and the like.

An image of a reference object may be taken. The image of the reference object may include (e.g., may also include) one or more of the tooth or the color calibration object (e.g., color checker). The reference object may be a reference card, such as reference card 200 having a color and an associated color value. In examples, the color of the reference card may be a neutral color, such as a white, tan, or a gray. A standard color of the reference card may be known. For example, the reference card may be provided to the user, and the provider of the reference card may know the standard color of the reference card.

The color value of the color of the reference card may be determined by the mobile device (e.g., a processor of the mobile device). The computed color value of the colors of the reference card may not be the same as the known (e.g., standard) color value of the reference card. Such discrepancies between the computed color value and the standard color value may be due to lighting in which the image of the reference card is taken, the lens of the camera taking the image of the reference card, the processor (e.g., processor speed) of the mobile device, and the like. It should be understood that although the description describes a single color value, this is for illustration purposes only, as one or more color values (e.g., each of the RGB values, each of the L*, a*, and b* values, and the like) may be determined. As shown on FIG. 5, row 506 shows example computed RGB values corresponding to No. 19 white, as determined by the mobile device. Row 510 of FIG. 5 shows the color value (e.g., computed color value) of the color of the reference card, as determined by the mobile device.

At 908, a color calibration coefficient may be determined. For example, the color calibration coefficient may be determined via the mobile device (e.g., a processor of mobile device 100), although in examples the color calibration coefficient may be determined remotely from the mobile device, such as via a server and the like. As shown on FIG. 5, row 508 shows example color calibration coefficients based on the determined and known color values of the color checker.

As described herein, the color calibration coefficient may be determined based on one or more of the color values of the known calibration color values and a corresponding computed calibration color value of the calibration color values. A corresponding color value for the white color of the color checker may be computed, for example, by the mobile device (e.g., the mobile device that captured the image of the color checker). The computed color value for the No. 19 white may be similar to the known color value for No. 19, although the computed color value may be different for one or more reasons as described herein.

The color calibration coefficient may be determined based on an association of the known color value of the No. 19 white and a corresponding computed calibration color value of the No. 19 white. Such an association may be a dividing of the known color value of the No. 19 white and the corresponding computed calibration color value of the No. 19 white, as shown on the example provided on row 508 of FIG. 5. In particular, row 508 of FIG. 5 shows such a dividing example, in which the known R color value of the No. 19 white is 243 and a corresponding computed calibration R color value of the No. 19 white is 212. The known R color value of the No. 19 white (243) may be divided by the corresponding computed calibration R color value of the No. 19 white (212), resulting in an R color calibration coefficient (e.g., tuning coefficient) of 1.1437. The same process applies to G and B color calibration as shown in FIG. 5. Although the description describes a single No. 19 color, it should be understood that this is for illustration purposes, and one or more other colors may be used to determine the color coefficient value.

At 910, a corrected reference color value (e.g., of the reference card) may be determined. Row 512 of FIG. 5 shows example corrected reference color values. The corrected reference color values may be based on the color calibration coefficient and the first computed reference color value (e.g., the first computed reference color value, computed above). For example, the corrected reference value may be determined by a multiplication of the color calibration coefficient and the first computed reference color value, as shown on FIG. 5. As described herein, the computed reference color (e.g., computed reference color value) of the reference card may be determined by one or more devices, such as the mobile device. The computed reference color value of the reference card may be different than the standard (e.g., known) reference color value. A corrected reference color value may be determined by multiplying the computed reference color of the reference card and the color calibration coefficient.

Another image (e.g., a second image) may be captured, for example, by the mobile device. The second image may include the color reference object (e.g., the same color reference object of which the image was previously taken, as described above) and/or the at least one tooth. Another (e.g., a second) computed reference color value may be determined of the color reference object (e.g., the reference card). Row 514 of FIG. 5 shows example values for the second computed reference color value of the color reference object. A computed object color value of the at least one tooth may be determined. Row 516 of FIG. 5 shows an example of a computed object color value of the at least one tooth. The other (e.g., second) computed reference color value and/or the computed object color value of the at least one tooth may be determined by one or more devices, such as by the mobile device, a server, and the like.

At 912, a corrected object color value (e.g., color value of the tooth) may be determined. The corrected object color value may be based on the corrected reference color value (e.g., the corrected color value of the reference card), the second computed reference color value (of the reference card), and/or the computed object color value (e.g., the computed color value of the tooth). For example, the corrected object color may be determined by computing an intermediate reference card value. As shown in row 518 of FIG. 5, the intermediate reference card value may be determined by dividing the corrected reference card value by the second computed reference color value. The intermediate reference card value may be multiplied by the computed object color value to determine the corrected object color value.

The corrected object color value may be determined in a first color space, such as in an RGB color space, a CIELAB color space, and the like. The corrected object color value may be determined in a second color space. The second color space may be different than the first color space, and may include a CIELAB color space, an RGB color space, and the like. The determination of the second color space may be based on the corrected object color value in the first color space. In an example the first color space may be the RGB color space and the second color space may be the CIELAB color space. The conversion of the corrected object color value from the first color space (e.g., RGB color space) to the second color space (e.g., CIELAB color space) may be known by those of skill in the art. FIG. 4C shows an example table showing an example of converted values (e.g., RGB values converted to CIELAB values of the XRite Color Standards).

As described herein, the corrected object color value in the second color space may be as a result of a conversion of color values from another color space (such as a conversion of color values of the first color space to the second color space). A conversion of the corrected object color value in the first color space may result in a corrected object color value in the second color space.

The corrected object color values in the second color space (e.g., the CIELAB values) may undergo a transformation. For example, the corrected object color value in the second color space may undergo a transformation so that the corrected object color values in the second color space are closer to the true object color values in the second color space. A mathematical matrix may be used with the corrected object color values in the second color space to determine final corrected object color values in the second color space that may be closer to the true object color values in the second color space.

An example mathematical matrix is provided below in Equation 1.0. The mathematical matrix may be determined from the corrected object color values (e.g., calibration color target) in the second color space (shown on FIG. 4C) and the published CIE L*a*b* of Xrite Colorchecker (shown on FIG. 4A). The matrix (e.g., the 3×3 transformation matrix) may be used to determine the final corrected object color values in the second color space (as shown on FIG. 4B). For example, as shown in Equation 1.0, the final corrected object color values in the second color space may be based on an association between the corrected object color values in the second color space and the matrix (e.g., the 3×3 matrix). As shown in Equation 1.0, L*, a* and b* may correspond to FIG. 4B (which are the final corrected object color values in the second color space), and L*', a*' and b*' may correspond to FIG. 4C (which are the corrected object color values in the second color space).

$$
\begin{bmatrix}
L_1^* & a_1^* & b_1^* \\
L_2^* & a_2^* & b_2^* \\
L_3^* & a_3^* & b_3^* \\
L_4^* & a_4^* & b_4^* \\
L_5^* & a_5^* & b_5^* \\
\cdots & \cdots & \cdots \\
\cdots & \cdots & \cdots
\end{bmatrix}
=
\begin{bmatrix}
L_1^{*\prime} & a_1^{*\prime} & b_1^{*\prime} \\
L_2^{*\prime} & a_2^{*\prime} & b_2^{*\prime} \\
L_3^{*\prime} & a_3^{*\prime} & b_3^{*\prime} \\
L_4^{*\prime} & a_4^{*\prime} & b_4^{*\prime} \\
L_5^{*\prime} & a_5^{*\prime} & b_5^{*\prime} \\
\cdots & \cdots & \cdots \\
\cdots & \cdots & \cdots
\end{bmatrix}
\begin{bmatrix}
1.039 & -0.041 & 0.004 \\
-0.007 & 1.073 & 0.097 \\
-0.085 & 0.285 & 0.860
\end{bmatrix}
\qquad \text{Equation 1.0}
$$

Figure 6A:
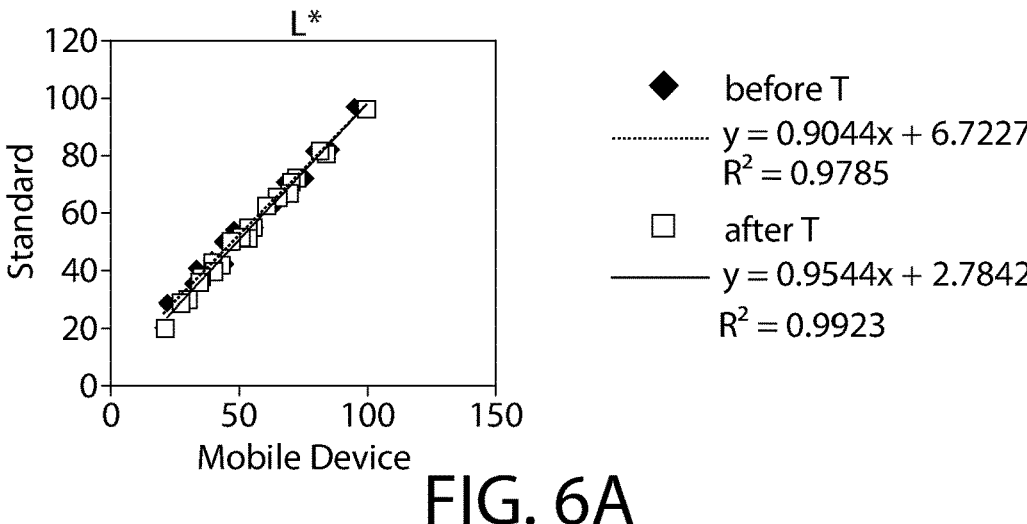
FIGS. 6A-6C are plots showing improvements to determinations of whiteness values, as described herein.
Figure 6B:
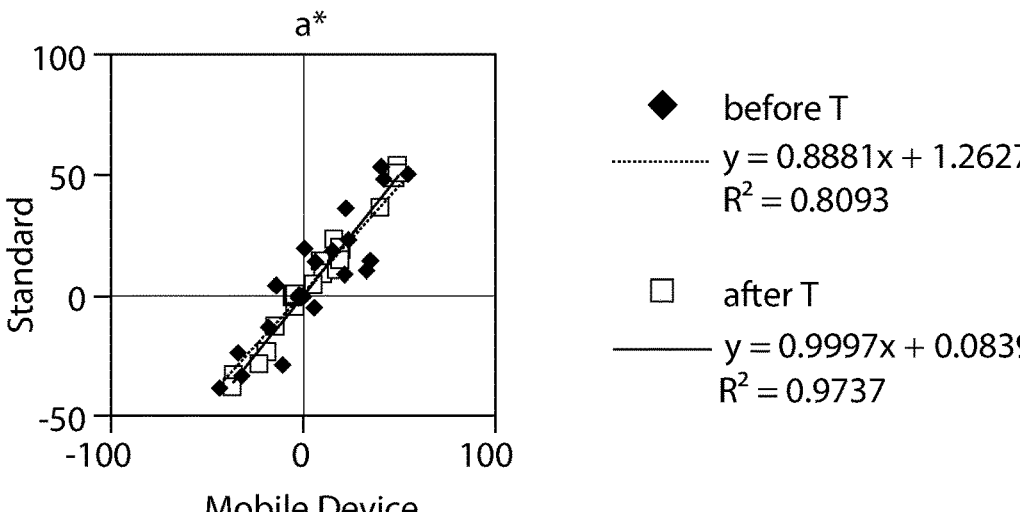
Figure 6C:
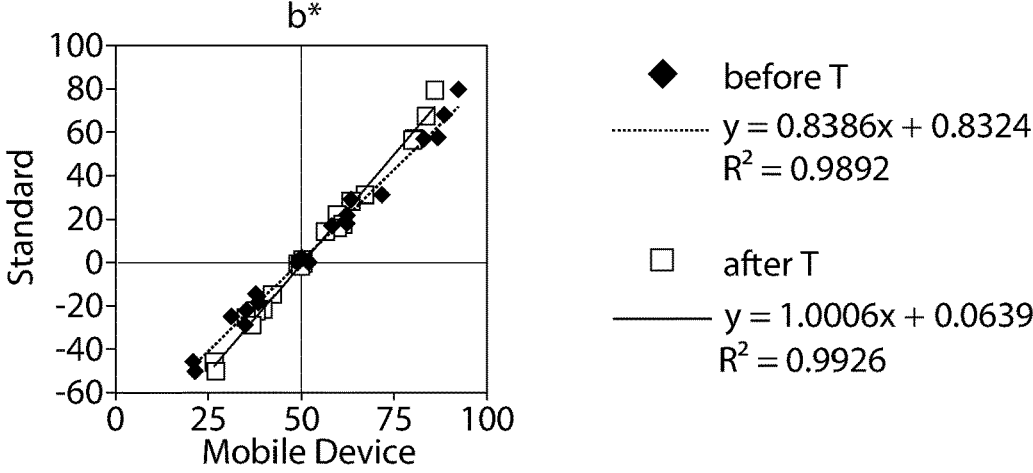

As described herein, the transformation (e.g., transformation matrix) may be used to convert CIELAB color values of the XRite color standard into the working set (e.g., final working set) of L*a*b*, as shown in the table of FIG. 4B. The transformation may provide an improved color quality (e.g., improved determination of a color value). The improved color quality (e.g., improved determination of a color value) may be proven by statistical analysis. For example, the improved color quality may be proven by statistical analysis on R-square of L*a*b* values before and after transformation against a true L*a*b*. For example, the R-square of L* was from 0.9785 before transformation to 0.9923, that of a* from 0.8093 to 0.9737, and that of b* from 0.9892 to 0.9926, as shown in FIGS. 6A-6C (with 'T' in the figures indicating Transformation). The improved color quality (e.g., improved determination of a color value) may be shown (e.g., may also be shown) by the slope after T being closer (e.g., much closer) to the theoretical value of 1, and the intercept being closer (e.g., much closer) to the theoretical value of 0. The transformed corrected object value may be the whiteness value of the tooth. The transformed corrected object value of the whiteness of the tooth may be the same whiteness value for one or more devices capturing an image of the tooth.

The color components (e.g., three CIELAB color components) may be configured in one or more algorithms and processed by the mobile device to generate (e.g., directly generate) high quality color information of an object (such as a tooth) to be used. In an example, the CIELAB color components may be the final working data set. The working data set may be calculated into other whitening indices, such as W, WIO, YIO, etc. which may be known to those of skill in the art, which may include dental professionals, researchers, and the like. In other examples the working data set may be correlated to one or more shade numbers, which may be relevant to consumers, such as consumers using the mobile device at home to determine a whiteness value of their tooth.

Figure 8A:
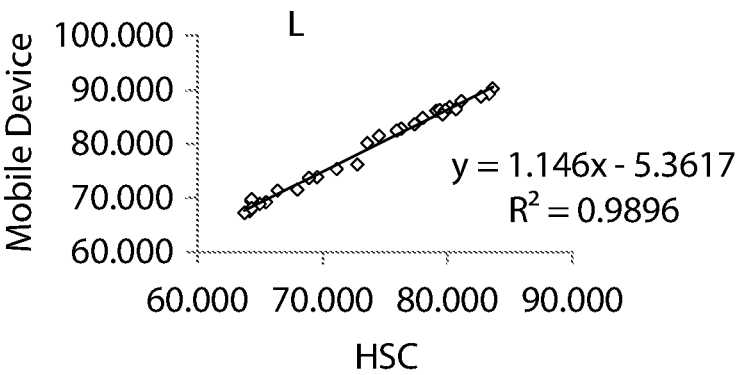
FIGS. 8A-8C are plots showing a correlation of data provided via a mobile device and a hyperspectral camera, as described herein.
Figure 8B:
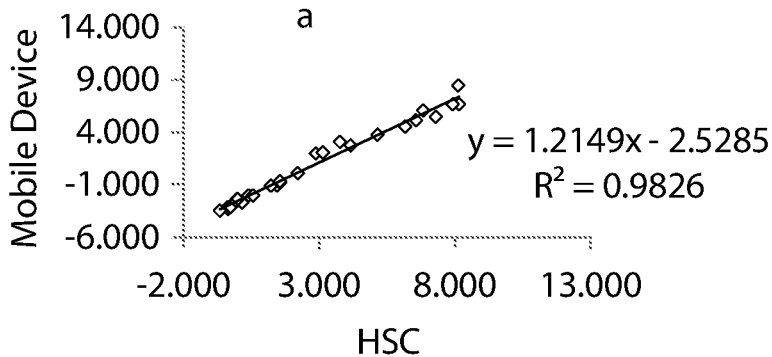
Figure 8C:
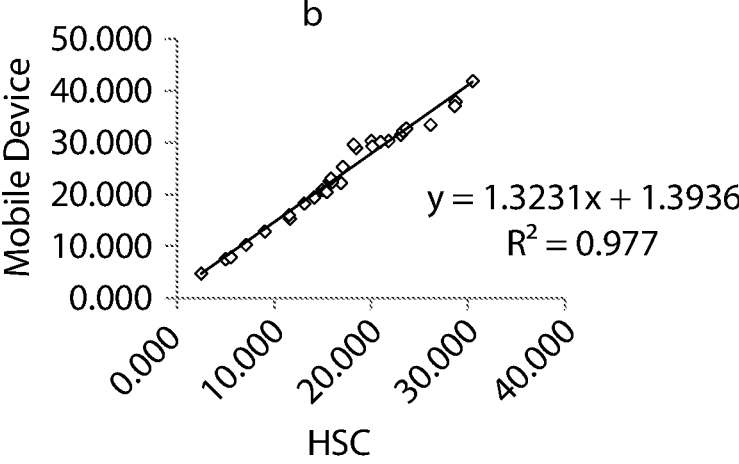

The process of determining the whiteness of one or more teeth described herein may be verified. For example, the process may be performed and/or tested on a mobile device. The process may be performed and/or tested on tooth whitener planners and/or testers, such as Vita Bleachedguide 3D Master, for example. The planner and/or tester may have one or more shade tabs, such as Vita Bleachedguide 3D Master having 29 physical shade tabs. In such example, shade tabs may be measured by the mobile device (e.g., measured one by one), corrected using (e.g., first using) a white reference color in one or more (e.g., each) image, converted to L*a*b*, and/or transformed to the final working L*a*b*. The shade tabs may be measured (e.g., may be measured at the same time) by one or more other color measurement devices, such as Hyperspectral Camera (Middleton Spectra Lab) which may yield L*a*b* values directly and/or may be used as to validate the algorithm. FIG. 7 shows a table listing example final working L*,a*,b* values from a mobile device and L*,a*,b* output from a Hyperspectral Camera (and graphed on FIGS. 8A-8C). As shown on FIGS. 8A-8C, the mobile device using the process described herein may measure the color values accurately, for example, as compared to a Hyperspectral Camera as there is good linear relationship in all measurement, R-squares of L*a*b* being very high and close to one.

While the inventions have been described with respect to specific examples including presently preferred modes of carrying out the inventions, those skilled in the art will appreciate that there are numerous variations and permutations of the above described systems and techniques. It is to be understood that other examples may be utilized and structural and functional modifications may be made without departing from the scope of the present inventions.

What is claimed is:

1. A computer-implemented method of determining a color value of a target object, the method comprising:
    capturing, via a mobile device, a first image comprising both a color calibration object and a color reference object, wherein the color calibration object comprises a plurality of calibration colors each having a known calibration color value and wherein the color reference object has a known color value;
    determining, based on the first image, computed calibration color values for each of the plurality of calibration colors of the color calibration object and a first computed reference color value for the color reference object;
    determining a color calibration coefficient based on a known color value of the known calibration color values and a corresponding computed calibration color value of the computed calibration color values;
    determining a corrected reference color value based on the color calibration coefficient and the first computed reference color value;
    capturing, via the mobile device, a second image comprising the target object;
    determining a second computed reference color value of the color reference object and a computed object color value of the target object;
    determining a corrected object color value based on the corrected reference color value, the second computed reference color value, and the computed object color value; and
    causing the corrected object color value to be displayed via a display; and
    wherein the computed object color value of the target object relates to a whiteness value of a tooth.

2. The method of claim 1, further comprising:
    identifying the corrected object color value as being in a first color space;
    determining the corrected object color value in a second color space based on a conversion of the corrected object color value in the first color space; and
    determining a final corrected object color value in the second color space based on a transformation of the corrected object color value in the second color space.

3. The method of claim 2, wherein the first color space is an RGB color space and the second color space is a CIE L*a*b color space.

4. The method of claim 2, further comprising:
    storing the final corrected object color value of the target object in the second color space; and
    tracking final corrected object color values of the target object in the second color space over a period of time.

5. The method of claim 1, wherein the computed object color value of the target object relates to the whiteness value of the tooth in the second color space.

6. The method of claim 5, further comprising:
    determining a progress of a whiteness treatment of the tooth based on the whiteness value of the tooth in the second color space.

7. The method of claim 1, wherein the second image comprises both the color reference object and the target object.

8. The method of claim 7, wherein the second computed reference color value of the color reference object is determined based on the second image.

9. The method of claim 1, wherein the color reference object is a reference card comprising an open window, the target object being viewable through the open window when the second single image is captured.

10. The method of claim 1, wherein the known color value of the calibration object comprises an R value of 243, a G value of 243, and a B value of 243.

11. The method of claim 1, wherein the determining steps are performed via a processor of the mobile device.

12. The method of claim 1, wherein the method is carried out for each of a red channel of the first and second images, a green channel of the first and second images, and a blue channel of the first and second images.

13. A non-transitory computer-readable storage medium encoded with instructions which, when executed on a processor, perform a method of:

capturing, via a mobile device, a first image comprising both a color calibration object and a color reference object, wherein the color calibration object comprises a plurality of calibration colors each having a known calibration color value and wherein the color reference object has a known color value;

determining, based on the first image, computed calibration color values for each of the plurality of calibration colors of the color calibration object and a first computed reference color value for the color reference object;

determining a color calibration coefficient based on a known color value of the known calibration color values and a corresponding computed calibration color value of the computed calibration color values;

determining a corrected reference color value based on the color calibration coefficient and the first computed reference color value;

capturing, via the mobile device, a second image comprising a target object;

determining a second computed reference color value of the color reference object and a computed object color value of the target object;

determining a corrected object color value based on the corrected reference color value, the second computed reference color value, and the computed object color value; and causing the corrected object color value to be displayed via a display; and wherein the computed object color value of the target object relates to a whiteness value of a tooth.

14. The non-transitory computer-readable storage medium of claim 13, wherein the instructions further perform:

identifying the corrected object color value as being in a first color space;

determining the corrected object color value in a second color space based on a conversion of the corrected object color value in the first color space; and determining a final corrected object color value in the second color space based on a transformation of the corrected object color value in the second color space.

15. The non-transitory computer-readable storage medium of claim 14, wherein the first color space is an RGB color space and the second color space is a CIE L*a*b color space.

16. The non-transitory computer-readable storage medium of claim 14, wherein the instructions further perform:

storing the final corrected object color value of the target object in the second color space; and tracking final corrected object color values of the target object in the second color space over a period of time.

17. The non-transitory computer-readable storage medium of claim 13, wherein the computed object color value of the target object relates to the whiteness value of the tooth in the second color space.

18. The non-transitory computer-readable storage medium of claim 17, wherein the instructions further perform:

determining a progress of a whiteness treatment of the tooth based on the whiteness value of the tooth in the second color space.

19. The non-transitory computer-readable storage medium of claim 13, wherein the second image comprises both the color reference object and the target object.

20. The non-transitory computer-readable storage medium of claim 19, wherein the second computed reference color value of the color reference object is determined based on the second image.

\* \* \* \* \*